United States Patent [19]
Rossi et al.

[11] Patent Number: 5,169,663
[45] Date of Patent: Dec. 8, 1992

[54] METHOD AND APPARATUS FOR PARTIALLY HUSKING CORN

[75] Inventors: Ralph J. Rossi, Coral Gables; Patrick C. McGuire, Miami, both of Fla.

[73] Assignee: Ready Machine, Inc., Miami, Fla.

[21] Appl. No.: 851,856

[22] Filed: Mar. 16, 1992

[51] Int. Cl.⁵ .................... A23L 1/00; A23N 7/00
[52] U.S. Cl. .................... 426/482; 99/585; 99/635; 99/643; 426/518
[58] Field of Search ............ 426/482, 481, 518; 99/585, 587, 635, 643

[56] References Cited

U.S. PATENT DOCUMENTS

| Re. 17,504 | 11/1929 | Morral | 99/635 |
|---|---|---|---|
| 722,448 | 3/1903 | Fitzpatrick | 460/38 |
| 1,963,141 | 6/1934 | Morral | 99/635 |
| 2,675,808 | 4/1954 | Hecht | 460/37 |
| 3,029,850 | 4/1962 | Reid | 426/482 |
| 3,451,397 | 6/1969 | Rauth | 99/643 |
| 4,816,277 | 3/1989 | Frankstein | 426/482 |

Primary Examiner—George Yeung
Attorney, Agent, or Firm—Robert C. Kain, Jr.

[57] ABSTRACT

The method of partially husking corn includes the steps of completely severing the first end of the ear of corn. The second end is partially crossed cut. The husk from the partially cut end is then rotated transversely with respect to the longitudinal axis of the corn ear. Subsequently and substantially concurrently, the husk is removed from the ear of corn by transversely pulling the husk away from the ear and longitudinally moving the ear along its axis. The corn husking apparatus includes a conveyor having corn holding channels which retain the ears of corn. The corn husker has a corn end cutter which cuts the first end of the corn. A trimmer is disposed next to the conveyor downstream and opposite the end cutter. The trimmer partially cross cuts the second end of the corn. A guide is disposed immediately downstream of the trimmer. The guide has an inboard surface which guides and rotates the corn husk away transverse with respect to the movement of the conveyor. A pair of counter rotating pinch rollers are disposed immediately downstream of the guide. The husk is fed by the guide into the rollers. The pinch rollers strip the husk from the ear substantially concurrently with the transverse ejectment of ear from the corn holding channel of the conveyor.

18 Claims, 4 Drawing Sheets

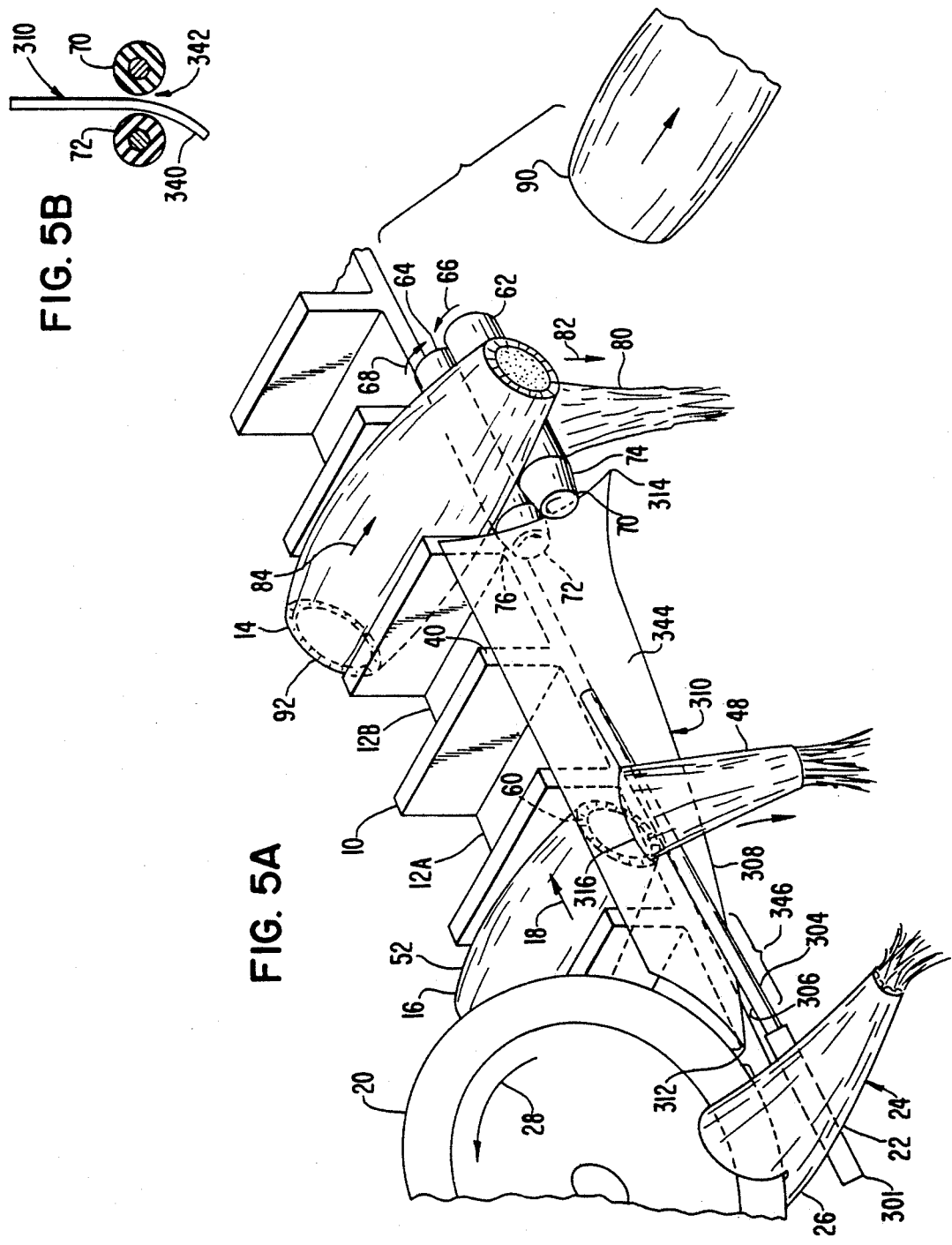

METHOD AND APPARATUS FOR PARTIALLY HUSKING CORN

BACKGROUND OF THE INVENTION

The present invention relates to a method and an apparatus for partially husking corn.

U.S. Pat. No. 4,816,277 to Frankstein discloses a method for husking corn wherein an ear of corn is placed on a conveyor and one end of the ear of corn is partially cut by a blade. The partially severed end is pushed downward below the conveyor belt by a top push roller. The downwardly directed, partially severed corn end is then trapped between a pair of pinch rollers which rotate in opposite directions and are disposed beneath the conveyor. A portion of the corn husk is torn from the corn cob from beneath the conveyor while the cob is held on the conveyor by the top push roller. The pinch rollers are longitudinally disposed in a plane generally passing through the longitudinal axis of the corn.

U.S Pat. No. 3,451,397 to Rauth discloses a corn husker which completely severs the corn butt and corn top prior to husking the corn. U.S. Patent No. Re 17,504 to Morral discloses a corn husker that utilizes husking rollers to remove the corn husk. U.S. Pat. No. 722,448 to Fitzpatrick discloses a corn husker that trims the butt and top of the corn then husks the corn with husking rollers. U.S. Pat. No. 1,963,141 to Morral discloses a corn husker using two sets of husking rollers.

U.S. Pat. No. 2,675,808 to Hecht discloses a corn husker using husking rollers. The husking rollers are positioned transversely with respect to the corn chute and the conveyor. The husking rollers are adapted to engage the corn on an upper side thereof and are rotated in a manner to pull the leaves upwardly between pairs of rollers.

Objects of the Invention

It is an object of the present invention to partially husk an ear of corn while simultaneously ejecting the corn from the conveyor belt carrying the corn.

It is another object of the present invention to partially cross cut an end of the corn and then rotate the partially severed corn husk, transversely with respect to the longitudinal axis of the ear of corn, prior to striping the corn husk from the ear.

It is a further object of the present invention to completely sever one end of the ear of corn and then partially cut or trim the other end of the ear of corn prior to transversely rotating the partially severed corn husk, and removing the longitudinal strip of husk.

Summary of the Invention

The method of partially husking corn includes the steps of completely severing the first end of the ear of corn from the main portion. The second end of the corn is partially crossed cut such that a substantial portion of the husk is severed form the main portion of the corn. The partially severed husk is then rotated substantially transversely with respect to the longitudinal axis of the corn ear. Subsequently and substantially concurrently, the partially severed corn husk is removed from the ear of corn by transversely pulling the corn husk portion away form the main ear portion and longitudinally moving the main ear portion along its axis substantially normal with respect to the pull of the severed husk portion. The corn husking apparatus includes a conveyor having corn holding channels which retain ears of corn such that the corn's longitudinal axis is normal to the movement of the conveyor. The corn husker has a corn end cutter disposed next to the conveyor which cuts the first end of the corn. A trimmer is disposed next to the conveyor downstream and opposite the end cutter. The trimmer partially cross cuts the second end of the corn such that a substantial portion of the husk is severed from the ear. A guide is disposed immediately downstream of the trimmer. The guide has an inboard surface which guides and rotates the partially severed corn husk transverse with respect to the movement of the conveyor. A pair of counter rotating pinch rollers are disposed immediately downstream of the guide. The partially severed corn husk is fed by the guide into the rollers and is caught between the forward ends of the pinch rollers. The pinch rollers strip the husk from the ear substantially concurrently with the transverse ejectment of ear from the corn holding channel of the conveyor.

BRIEF DESCRIPTIONS OF DRAWINGS

Further objects and advantages of the present invention can be found in the detailed description of the preferred embodiments when viewed in conjunction with the accompanying drawings wherein:

FIG. 1 diagrammatically illustrates the principle portions of the corn husking device;

FIG. 2 diagrammatically illustrates a top view of the corn husking apparatus;

FIG. 3 diagrammatically illustrates a side elevational view of the corn husking apparatus;

FIG. 4 diagrammatically illustrates a lateral cross-sectional view of the conveyor, the pinch rollers and a horizontal ejectment guide lying atop the pinch rollers;

FIG. 5A diagrammatically illustrates another embodiment of the guide and illustrates a finger rail for horizontally supporting the substantially fully severed corn end;

FIG. 5B illustrates the curved, lagging edge of the guide;

FIG. 6 diagrammatically illustrates various biasing mechanisms for holding the corn in the corn holding channels of the conveyor and providing a counter-rotative force on the main ear portion;

FIG. 7 diagrammatically illustrates a side elevational view of the biasing mechanisms in FIG. 6;

FIGS. 8 and 9 illustrate various details of the biasing mechanisms which precede and follow the trimming blade; and FIG. 10 diagrammatically illustrates a rolling table which horizontally supports the main ear portion during ejectment.

DETAILED DESCRIPTION OF THE PREFERRED EMBODIMENTS

The present invention relates to a method and an apparatus for partially husking ears of corn.

Figure 1:
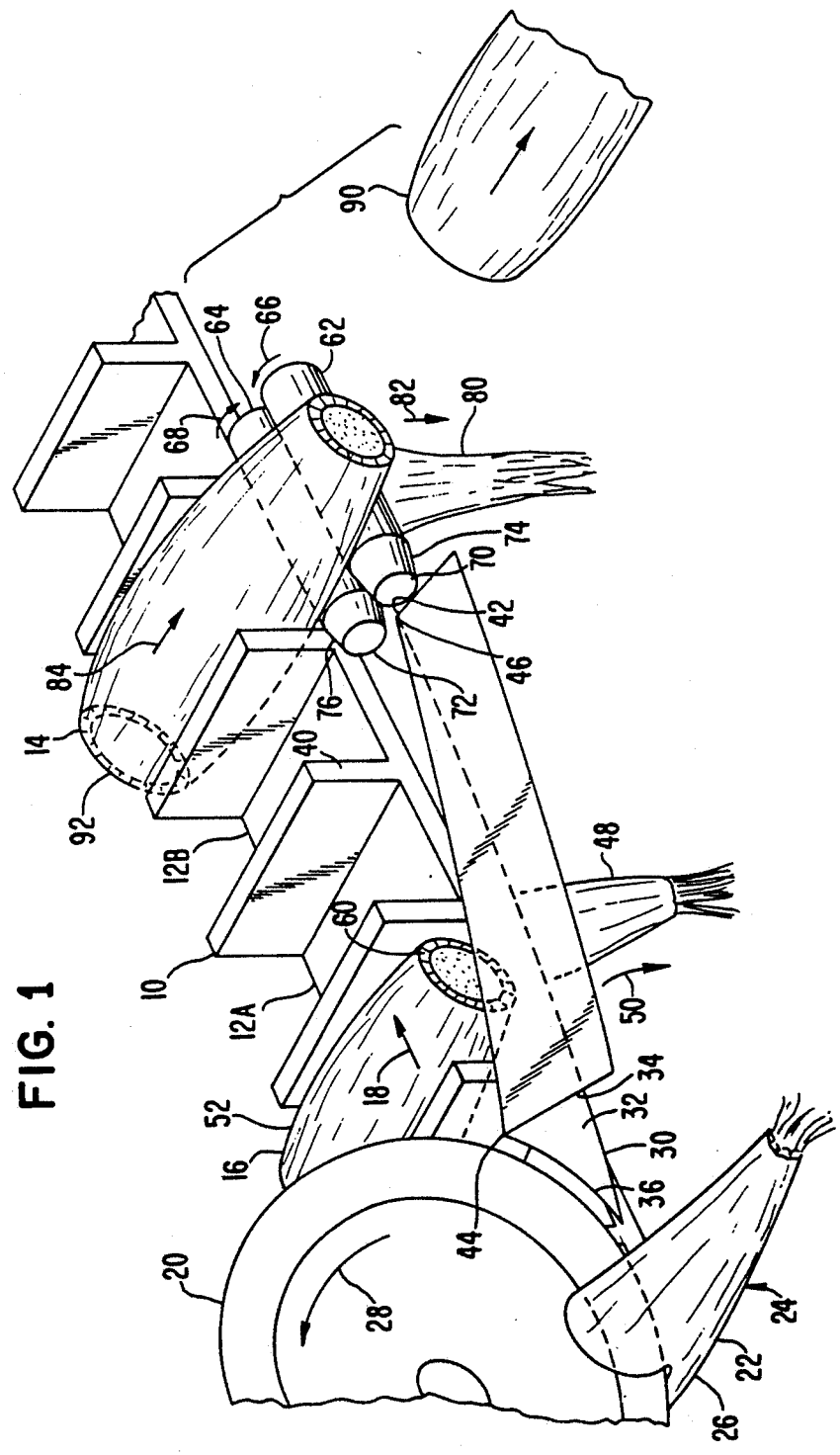

·FIG. 1 diagrammatically illustrates the primary components and steps involved in partially husking corn in accordance with the principles of the present invention. Conveyor belt 10 includes a plurality of corn holding channels or cradles 12 A, 12 B. Conveyor 10 generally supports corn ears 14 and 16 in a substantially horizontal plane. Conveyor 10 moves in a direction shown by arrow 18 which is transverse to the corn's axis. A corn end trimmer, configured as circular blade 20, trims or partially cross cuts end 22 of corn ear 24. A substantial portion (approximately 80%) of the outer husk 26 of corn ear 24 is severed from the main ear or body portion of corn 24 by blade 20. Blade 20 rotates in the direction shown by arrow 28.

Immediately downstream, that is immediately following blade 20, is a guide or sheath plate 30. Guide 30 includes inboard surfaces 32 and 34. Inboard surface 32 of guide 30 has a forward edge 36 that is disposed close to right side 40 of conveyor 10 and the rearward or lagging edge of blade 20. Inboard surface 32 has a rearward, lagging or downstream edge 42 that is disposed further away from right side surface 40 of conveyor 10 as compared with forward edge 36. Also, the apex or intersection defined by inboard surfaces 32 and 34 slopes downward from forward apex region 44 as compared with downstream or rearward apex region 46. Accordingly, partially severed husk end 48 of corn ear 16 rotates substantially transversely with respect to the longitudinal axis of corn ear 16 due to the position of inboard surface 32. Inboard surface 34 may also guide the partially severed corn husk. This rotation is illustrated by arrow 50. The rotation is transverse with respect to the corn's longitudinal axis. Further, partially severed husk portion 48 longitudinally moves away from main corn portion 52 of corn ear 16 due to the diverging position of the guide noted by the position of forward edge 36 of inboard surface 32 as compared with rearward edge 42 of that surface both with respect to the conveyor. Rotation of partially severed corn husk and 48 is also due in part to the declination of the inboard surfaces 32 and 34 of guide 30. This declination is noted by the declination of apex region 44 as compared with apex region 46, that is the forward apex in relation to the rearward or downstream apex of the guide. In one embodiment, blade 20 substantially fully severs the end of the corn cob previously surrounded by husk portion 48. This is noted by the illustration of corn kernels 60 and the exposed cob on ear 16. As used herein, the term "substantially fully severs" means that the corn cob end is fully cut a significant percentage of the time. In some cases, however, the corn cob end is so significantly severed that upon application of a minimal transverse force, the corn cob end breaks away from the main ear portion. The term "substantially fully severed" encompasses this aspect of the invention.

Guide 30, after transversely rotating partially severed corn husk end 48, feeds the fully rotated and downwardly positioned corn husk end 48 into a pair of pinch rollers 62 and 64. The pinch rollers are positioned near side 40 of conveyor 10 and are oriented parallel to the movement of the conveyor. These pinch rollers are rotated in opposite directions as shown by arrows 66 and 68. The forward ends 70, 72 of pinch rollers 62 and 68 are radially tapered from a small diameter, forward section to a large diameter, main section on the body of pinch rollers 62 and 64. Tapered regions 74 and 76 are illustrated in FIG. 1.

Partially severed husk portion 48 is feed into the mouth of the pinch rollers defined by the tapered forward ends of pinch rollers 62 and 64 by guide 30. Since conveyor is moving in direction 18 and since pinch rollers 62 and 64 are counter-rotating in directions 66 and 68, the partially severed husk portion of ear 14, that is husk portion 80, is trapped between the counter-rotating pinch rollers and is removed or striped from ear 14. This removal is accomplished by transversely pulling husk portion 80 away from the horizontally supported main ear portion of ear 14. This transverse pulling is in the direction shown by arrow 82, that is, transverse to the corn's axis. Since the counter-rotating pinch rollers transversely remove or pull husk portion 80, away from ear 14, the ear concurrently moves longitudinally along its axis in a direction shown by arrow 84. As is noted in FIG. 1, longitudinal, axial movement in direction 84 is normal to the transverse pulling of corn husk portion 80. The longitudinal movement of ear 14 is caused by the stripping of husk portion 80 from the corn ear. The stripping of the husk causes ejectment of the ear from the corn cradles on the conveyor as shown by ejected ear 90. Accordingly, an entire longitudinal strip of corn husk is removed from the ears of corn since pinch rollers 62 and 64 completely pull a longitudinal section of husk from the ears.

Prior to partially severing the husk from an ear of corn, the opposite end of the ear of corn has been completely severed from the main body of the ear. Accordingly, FIG. 1 shows end 92 of corn ear 14 having an exposed circumferential ring of kernels similar to circumferential ring 60 as well as an exposed corn cob end. Pinch rollers 62 and 64 completely strip the longitudinal section of corn husk 80 from ear 14 and the ear is completely ejected from the conveyor's channels, by the action of the pinch rollers.

Preferably, at least 80% of the corn husk is partially severed by circular trimming blade 20. It should be noted that the removal of the partially severed corn husk portion by pinch rollers 62 and 64 occurs substantially concurrently if not simultaneously with the longitudinal movement of corn ear 14 along its axis from the corn holding channel of conveyor 10. The removal of the longitudinal section of corn husk and the longitudinal, axial movement of the corn ear occurs as a single mechanical step.

Figure 2:
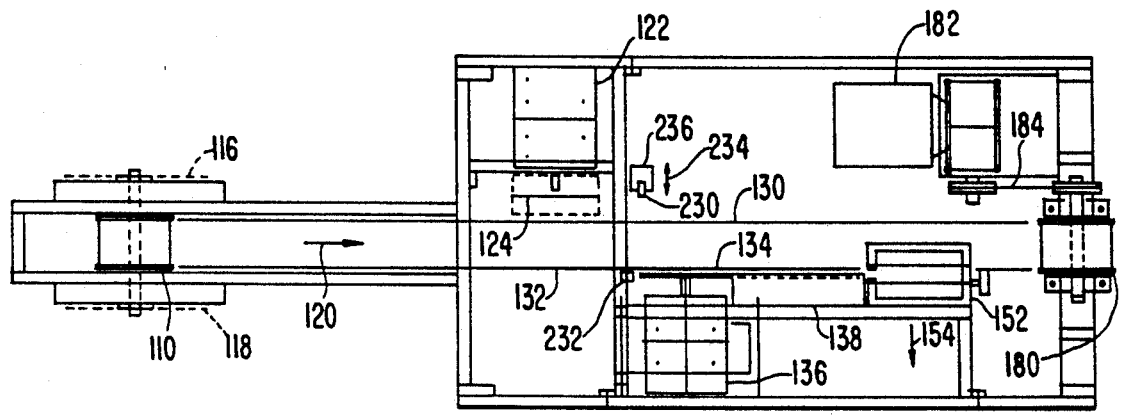
Figure 3:
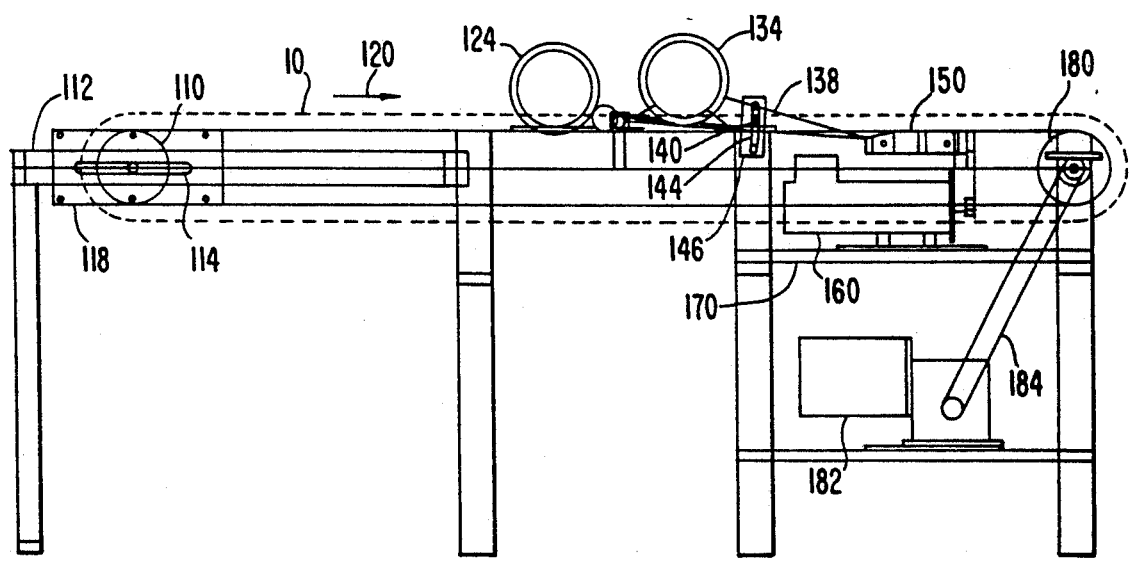

FIGS. 2 and 3 diagrammatically illustrate a top view of the corn husking apparatus and the side elevational view of that apparatus. FIGS. 2 and 3 are discussed concurrently herein with similar numerals designating similar items in these figures. To better illustrate the components of the corn husking apparatus, conveyor belt 10 is shown as dashed lines in FIG. 3 and the corn channels are not illustrated at all in FIGS. 2 and 3. Conveyor belt 10 partially wraps around pulley 110. Pulley 110 is adjustably mounted on support structure 112. This adjustable mount is noted by horizontally oriented slot 114. A complimentary slot is found in side panel 116. Slot 114 is found in side panel 118. Tension on conveyor belt 10 can be controlled by adjustably moving pulley 110 within slot 144 and its complimentary slot on the opposite side panel.

Conveyor 110 moves in the direction shown by arrow 120. Motor 122 drives a circular blade 124. Blade 124 completely severs a first end of an ear of corn which is placed on conveyor belt 10. In a preferred embodiment, the base of the ear is completely severed from the main portion or body of the corn ear. However, it may be possible to completely sever the top of the ear, partially sever the base of the ear and thereafter strip a longitudinal section of husk from the corn as described herein. Full cross cut blade 124 is disposed near the left side 130 of conveyor 10. Disposed near the right side 132 of conveyor 10 is circular blade 134 which partially cross cuts or trims the second end of the ear of corn. Trimming blade 134 is driven by motor 136. Guide 138 is disposed immediately downstream or following trimming blade 134. The horizontal positioning of the trimming blade and drive motor can be adjusted by moving motor support mount 140 in slot 144 of mount plate 146. Plate 146 is affixed to the support frame. The guide 138 is described above with respect to FIG. 1. As illustrated in FIG. 3, the forward or leading end of guide 138 is higher than the rearward, lagging or following end of guide 138. Counter-rotating pinch rollers are disposed immediately downstream of the rearward end of guide 138. One pinch roller is identified as roller 150 in FIG. 3. The guide rollers are rotatably mounted in box-like structure 152. The box-like structure defines the horizontal guide plates atop the rollers. See FIG. 4. Partially husked corn is ejected from the conveyor in the direction shown by arrow 154. The counter-rotating pinch rollers are driven by motor 160 mounted beneath the rollers on support platform 170. The rollers are described in detail with reference to FIG. 1. Conveyor 10 is driven by drive pulley 180 which is powered by motor 182 through an acceptable drive mechanism such as belt or chain 184.

Figure 4:
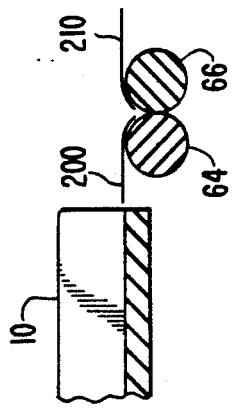

FIG. 4 diagrammatically illustrates conveyor 10 and horizontal guide plates 200 and 210 disposed adjacent and generally atop but spaced from pinch rollers 64 and 66. Horizontal top guides 200 and 210 are utilized to ensure that the corn slides along its axis away from conveyor belt 10 due to the stripping of the husk by the pinch rollers. Preferably, pinch rollers 64 and 66 are rubber and peripheral surfaces thereof are in contact with each other.

In order to ensure that the corn end is sufficiently partially cut by trimming blade 134, various mechanical sensors and pushers can be used to sense the position of the corn on the conveyor and push the main ear portion along its axis in the corn cradles. One mechanism uses a solenoid driven push rod 230 to push the cut base of the corn towards sensor 232. Solenoid push rod 230 moves back and forth as shown by double headed arrow 234 under the control of solenoid 236. Solenoid 236 is controlled primarily by sensor 232 which senses the position of the other end of the corn ear. Sensor 232 may be a mechanical position sensor or an opto-electrical position sensor. In a current working embodiment, a spring-loaded push bar engages the freshly cut end of the main ear portion and moves the ear toward trimming blade 134. Additionally, horizontal support ramps which hold up the corn ends are disposed immediately below full cross cut blade 124 and trimming blade 134. These ramps have a tapered leading surface which slopes upward at an incline. Thereafter, the ramp defines a level support for the corn end which will be fully cut by blade 124 or partially cut by blade 134.

In a working embodiment, the corn husking device can husk 200 ears of corn per minute.

FIG. 5A diagrammatically illustrates another embodiment of the guide (the currently preferred embodiment), and further illustrates a finger rail for horizontally supporting the fully severed corn end. Similar numbers designate similar items in FIGS. 1 and 5A. The significant differences between the two embodiments of the present invention are discussed below.

Immediately disposed below trimming blade 20 is a horizontal support ramp 301. The horizontal support ramp biases or holds up end 22 of corn ear 24 such that the trimming blade 20 cuts a certain portion of corn 24. A finger rail 304 protrudes from the lagging end of support ramp 301 generally parallel to the conveyor. Initially, partially severed corn end 22 rides on top surface 306 of finger rail 304. However, the bottom edge 308 of guide 310 provides a declining edge from leading edge point 312 as compared with flared out lagging edge point 314. Since the corn cob end 316 is substantially fully severed by trimming blade 20 and only a substantial portion of husk 48 is cut by the trimming blade, the corn cob end 316 separates from partially severed corn husk 48 and rides on top surface 306 of finger rail 304. In contrast, the partially severed corn husk 48 is eventually pulled below finger rail 304 by the declination of lower edge 308 of guide 310. Guide 310 is substantially planar and is disposed normal with respect to the horizontal plane of conveyor 10. However, the lagging edge 314 of the plate is flared away from the conveyor as shown in FIG. 5B. Lagging edge 340 of guide 310 protrudes into mouth region 342 defined by forward roller ends 70 and 72. As shown in FIG. 5B, the outer regions of the pinch rollers are made of rubber which surround an inner metal core. The core may be plastic.

Surface 344 of guide 310 initially separates partially severed husk 48 from corn end 316, generally in region 346. Thereafter, lower edge 308 of guide 310 further rotates partially severed husk 48 downward and transversely with respect to main corn portion 52 of corn ear 16 while corn end 316 rides on rail 304. Ultimately, severed corn end 316 drops from finger rail 304.

Figure 6:
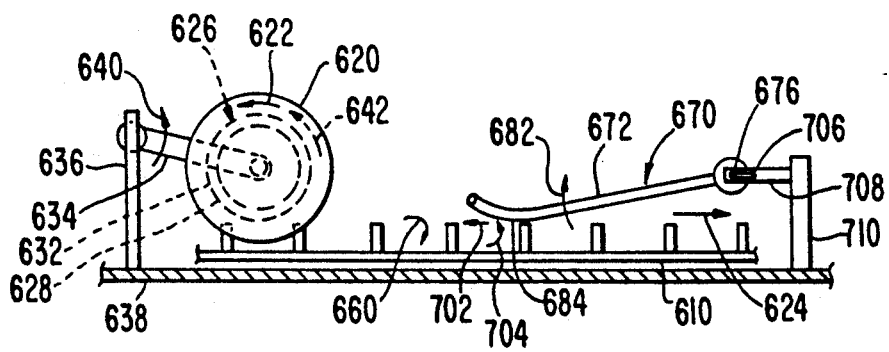
Figure 7:
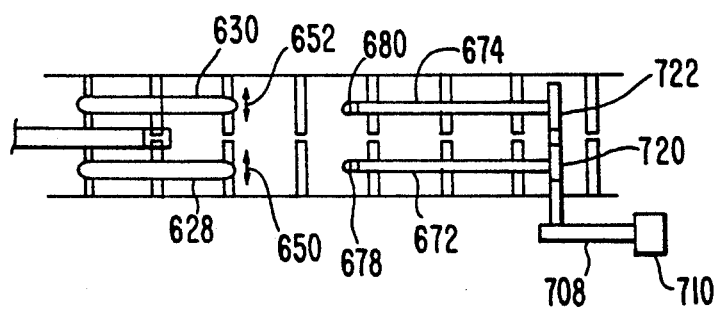

FIG. 6 diagrammatically illustrates various biasing mechanisms for holding the corn in the corn holding channels or cradles of the conveyor. Particularly, the conveyor is schematically illustrated as conveyor 610. Trimming blade 620 rotates in the direction shown by arrow 622. Conveyor 610 moves in the direction shown by arrow 624. The first biasing mechanism 626 biases the corn ears towards the horizontal plane of the conveyor 610 immediately before or concurrently with trimming blade 620. Biasing mechanism 626 includes a pair of circular rollers 628 and 630. FIG. 6 generally shows an elevated side view of the system, whereas FIG. 7 generally shows a top view of the system. Both figures are discussed concurrently herein. The roller wheels 628 and 630 have rounded rubber peripheral regions 632. Wheels 628 and 630 are rotatably supported on lever arm 634. Lever arm 634 is rotatably supported by support 636 which in turn is fixed to frame support 638. Downward movement of wheels 628 and 630 is limited by an appropriate mechanical limiter such that the lower edges of the wheels are proximate the top edge of conveyor cradles. Upward movement of the wheels is permitted in the direction of arrow 640 when the wheels ride on the corn. Wheels 628 and 630 also rotate as shown by arrow 642. Wheels 628 and 630 move in direction 640 as well as wobble or canter in the direction shown by arrows 650 and 652. Biasing system 626 is immediately upstream or aligned with trimming blade 620 in order to keep the main portion of the corn ear in the corn cradle while the corn end is substantially fully severed. Further details of the biasing mechanism 626 are discussed below with respect to FIGS. 8 and 9.

It has been found in a working embodiment that sometimes the main portion of the corn ears rotates in direction 660 when the partially severed husks are rotated and guided by the guide 310 shown in FIG. 5A. Accordingly, a second biasing mechanism 670 is utilized. Biasing mechanism 670 includes a pair of arms 672 and 674. These arms are rotatably held at pivot point 676. The arms are generally covered by plastic or rubber and upturned metal tips 678 and 680. Biasing arms 672 and 674 rotate or pivot upward as shown by arrow 682 when the main ear portion reaches lower arm region 684. Lower arm region 684 of biasing arm 672 is spaced slightly above the top of the cradles of conveyor 610 by a mechanical limiter. When the main ear portion of the corn strikes lower arm region 684, a force is delivered to the top of the ear in a direction shown by arrow 702. The force is opposite the movement of conveyor 610, that is, opposite direction 624. Due to the application of this tangential force on the corn ear, the corn ear rotates as shown by arrow 704. This rotation ensures that the partially severed corn husk enters mouth 342 of the pinch rollers. Biasing arms 672 and 674 can be horizontally adjusted by moving pivot axle 676 in slot 706 of support arm 708. Support arm 708 is mounted to frame support 638 via support pole 710. Biasing arms 672 and 674 rotate independently on sleeves 720 and 722 about pivot axle 676.

Other biasing mechanisms could be used to horizontally retain and downwardly bias the corn in the corn cradles and apply the counter-tangential force 702 to the ears of corn held in the cradles. For example, a static bar may suffice to hold the corn in the cradles thereby replacing horizontal biasing mechanism 626 as well as biasing mechanism 670. Spring loaded arms could also be used. In the present working embodiment, horizontal biasing mechanism 626 operates by gravity as does the following biasing mechanism 670.

Figure 8:
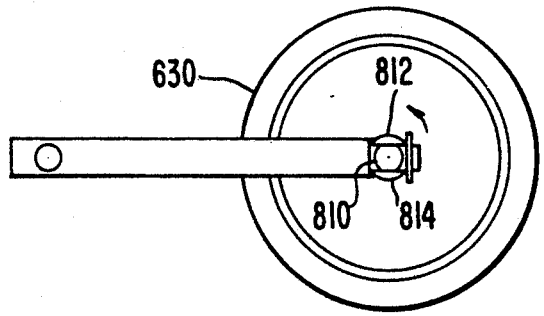
Figure 9:
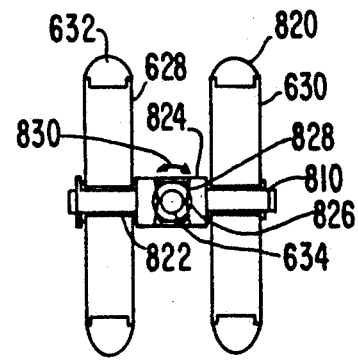

FIGS. 8 and 9 show certain details regarding the horizontal biasing mechanism 626. Roller 630 is shown being rotatably mounted on axle 810. Bearings or bushings 812 and 814 are diagrammatically illustrated in FIG. 8. In FIG. 9, wheel 628 is shown as having peripheral rubber bumpers 632 and wheel 630 includes peripheral rubber bumpers 820. Roller 630 is mounted on axle 810. Roller 628 is mounted on axle 822. Axles 810 and 822 are mounted to central hub 824. Support rod lever arm 634 terminates in an end cap 826. The end cap is trapped within central hub 824 by hub cap 828. Accordingly, rollers 628 and 630 can rotate or canter as shown by the double headed arrow 830. In a working embodiment, a second biasing mechanism similar to mechanism 626 is used preceding full cut blade 124.

Figure 10:
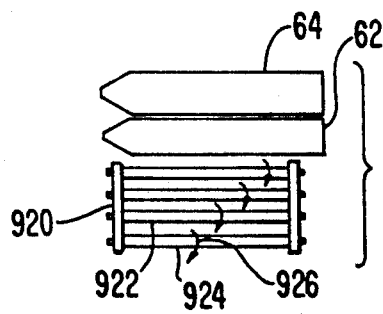

FIG. 10 diagrammatically illustrates pinch rollers 64 and 62. In order to provide horizontal support for the ejecting ear, a horizontal conveyor platform 920 is utilized. Conveyor platform 920 includes a plurality of rotatably mounted rods, two of which are identified as rods 922 and 924. All axle rods can rotate as shown by the arrows in FIG. 10, and specifically by arrow 926.

The claims appended hereto are meant to cover modifications and changes within the scope and spirit of the present invention.

What is claimed is:

1. A method of partially husking corn comprising the steps of:
    completely severing a first end of an ear of corn from a main portion thereof;
    partially cross cutting a second end of said ear of corn such that a substantial portion of corn husk is severed from said main portion of said ear;
    rotating the partially severed husk portion such that the partially severed husk portion is substantially transversely oriented with respect to a longitudinal axis of said main ear portion;
    substantially concurrently:
    removing said partially severed husk portion by transversely pulling said husk portion away from said main ear portion; and,
    longitudinally moving said main portion of said ear along its axis substantially normal with respect to the pull of said severed husk portion.

2. A method as claimed in claim 1 wherein the step of partially cross cutting severs at least 80% of said husk from said main ear portion and substantially fully severs an adjacent corn end from said main ear portion.

3. A method as claimed in claim 2 including the step of supporting said adjacent corn end while rotating said partially severed corn husk.

4. A method as claimed in claim 3 wherein the step of supporting the adjacent corn end substantially coaxially with respect to the longitudinal axis of said main ear portion.

5. A method as claimed in claim 1 wherein the step of removing and longitudinally moving occurs substantially simultaneously as a single mechanical step.

6. A method as claimed in claim 1 wherein the step of rotating includes the step of substantially concurrently longitudinally separating said partially severed husk portion from said main ear portion.

7. A method as claimed in claim 1 wherein the step of completely severing precedes the step of partially cross cutting.

8. A method as claimed in claim 1 including the step of continuously moving said ear of corn in a substantially horizontal plane during the steps of completely severing and partially cross cutting, and wherein the step of rotating moves the partially severed husk portion downward with respect to said horizontal movement of said main ear portion and the step of removing downwardly pulls said husk portion away from said main ear portion, and the step of longitudinally moving moves the main ear portion normal to the downward pull while said main ear portion longitudinally moves substantially within said horizontal plane.

9. A method a claimed in claim 8 wherein the steps of removing and longitudinally moving includes the step of ejecting said main ear portion longitudinally away during the removal step.

10. A method as claimed in claim 9 wherein the step of removing and longitudinally moving occurs substantially simultaneously as a single mechanical step.

11. A method as claimed in claim 10 wherein the step of rotating includes the step of substantially concurrently longitudinally separating said partially severed husk portion from said main ear portion.

12. A method as claimed in claim 10 wherein the step of completely severing precedes the step of partially cross cutting.

13. A method as claimed in claim 12 including the step of biasing said main ear portion towards said horizontal plane during a portion of said partially cross cutting step.

14. A method as claimed in claim 12 including the step of applying a force opposite the horizontal movement of said ear of corn subsequent to said partial cross cutting step and prior to removing said partially severed husk.

15. A method of partially husking corn comprising the steps of:
    partially cross cutting an end of an ear of corn such that a substantial portion of corn husk is severed from a main portion of said ear;
    rotatably guiding, with respect to a longitudinal axis of said ear, the partially severed husk portion away from the main ear portion;
    substantially concurrently:

removing said partially severed husk portion by transversely pulling said husk portion away from said main ear portion; and, longitudinally moving said main portion of said ear along its axis substantially normal with respect to the pull of said severed husk portion.

16. An apparatus for partially husking corn comprising:
- a conveyor having corn holding channels which retain ears of corn such that the corn's longitudinal axis is normal to the movement of said conveyor;
- a corn end cutter disposed next to said conveyor such that a first end of said corn is severed from a main portion of said corn ear;
- a corn end trimmer disposed next to said conveyor downstream of said corn end cutter, said trimmer partially cross cutting a second end of said corn such that a substantial portion of said husk is severed from said main portion of said ear;
- a husk guide disposed immediately downstream of said trimmer, said guide having an inboard surface guiding and rotating said partially severed corn husk away from and transverse to the movement of said conveyor;
- a pair of counter-rotating pinch rollers disposed immediately downstream of said guide such that the partially severed corn husk are caught therebetween and said pinch rollers strip said husk from said main corn portion substantially concurrently with the transverse ejectment of said main corn portion from said corn holding channel.

17. An apparatus as claimed in claim 16 wherein the upstream ends of said pinch rollers are tapered to jointly form a mouth for entry of said partially severed husk therein.

18. An apparatus as claimed in claim 17 including means for biasing said main ear portion in said corn holding channels.